Patented Feb. 6, 1923.

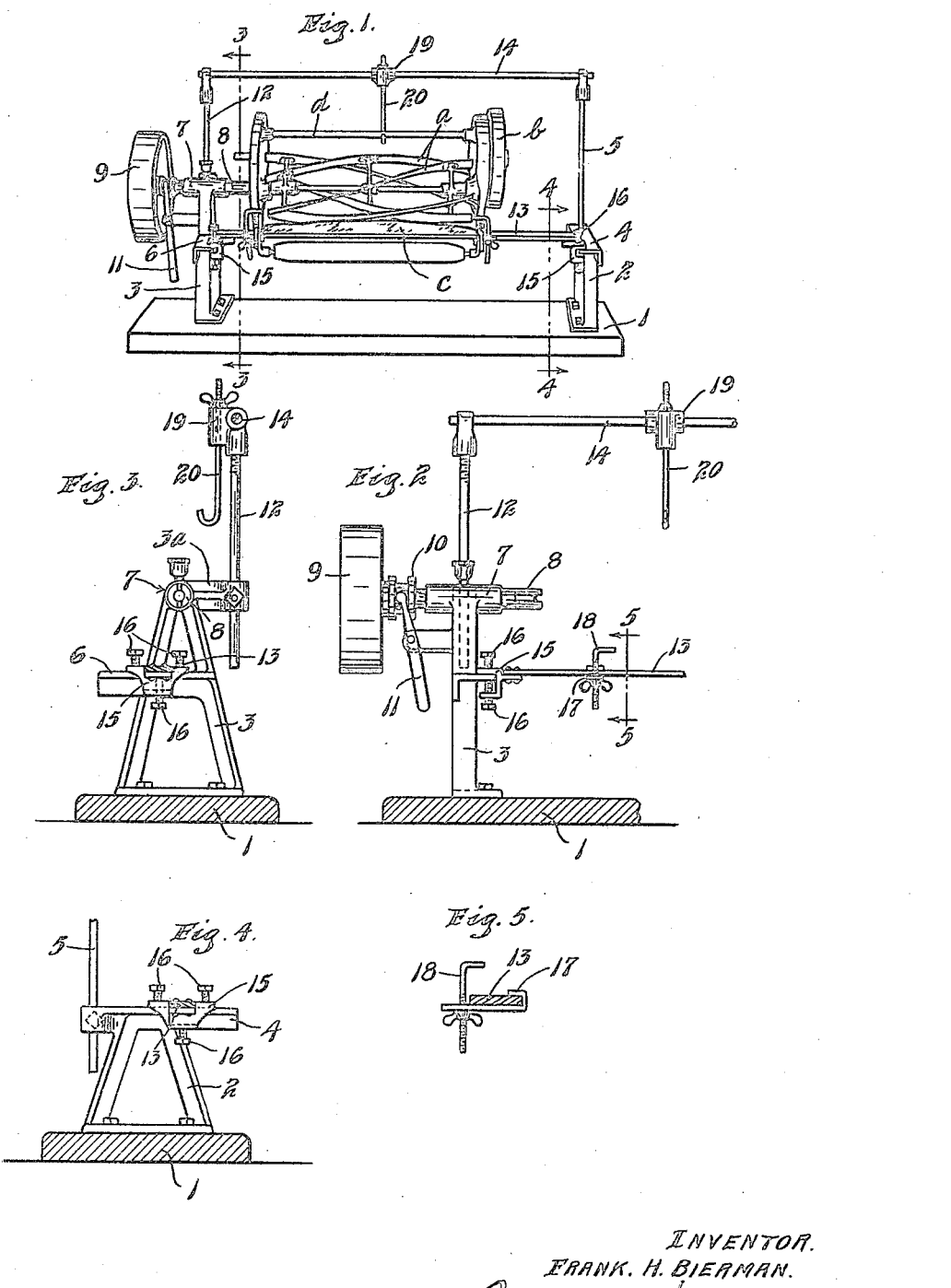

1,444,100

UNITED STATES PATENT OFFICE.

FRANK H. BIERMAN, OF MINNEAPOLIS, MINNESOTA.

LAWN-MOWER-SHARPENING MACHINE.

Application filed February 20, 1922. Serial No. 537,852.

*To all whom it may concern:*

Be it known that I, FRANK H. BIERMAN, a citizen of the United States, residing at Minneapolis, in the county of Hennepin and State of Minnesota, have invented certain new and useful Improvements in Lawn-Mower-Sharpening Machines; and I do hereby declare the following to be a full, clear, and exact description of the invention, such as will enable others skilled in the art to which it appertains to make and use the same.

This invention relates to a machine for sharpening a lawn mower of the type in which the cutter head of the lawn mower, including the cutting bar and the supporting wheels for the head, are placed in the machine. As is well known, the blades of the cutter head frequently become dull and get out of proper alinement with the cutting bar.

It is an object of this invention, therefore, to provide a machine in which the cutters and cutting bar can be supported in correct relation, together with means by which the same may be easily supported and handled in the machine.

It is a further object of the invention to provide such a device having various adjustable parts for facilitating the locating of the lawn mower parts therein and also having means for applying power thereto.

These and other objects and advantages of the invention will be fully set forth in the following description made in connection with the accompanying drawings in which like reference characters refer to the same parts throughout the different views, and in which Fig. 1 is a perspective view of the device showing parts of the lawn mower therein;

Fig. 2 is a view in front elevation of one end of the machine shown on an enlarged scale;

Fig. 3 is a vertical section taken on the line 3—3 of Fig. 1, as indicated by the arrows;

Fig. 4 is a vertical section taken on the line 4—4 of Fig. 1, as indicated by the arrows; and Fig. 5 is a vertical section taken on the line 5—5 of Fig. 2 indicated by the arrows.

Referring to the drawings, the device comprises a frame including a base member 1 and spaced end members 2 and 3. The end member 2 is in the form of a trapezoidal frame having a horizontal flat angular plate-like portion 4 extending forwardly therefrom, which portion also projects somewhat at the rear and is formed as an apertured boss adapted to receive a vertically and upwardly extending rod 5. The end member 3 is formed similarly to the end member 2 and has a flat angular forwardly extended plate-like portion 6. The end member 3 also has a triangular portion extending upwardly therefrom, the upper end of which is formed as a cylindrical bearing 7 apertured to receive and support a horizontal shaft formed at its front end as, or having secured thereto, a head 8 having an end bore therein and provided with a transverse slot. The outer end of the shaft supports a driving pulley 9 provided with any suitable form of clutch means connected to and operated by the clutch collar 10 and clutch lever 11, the latter being pivoted to an arm extending laterally from the end member 3. A bracket 3ª extends rearwardly from the member 7 and forms an apertured boss adapted to receive a vertical upwardly extending rod 12. The rods 5 and 12 are vertically adjustable in the members 3ª and 4 and are held in adjustable position therein by suitable set screws. These rods have heads threaded thereon at their upper ends formed with transversely extending apertures which are alined and receive and support a bar or rod 14 extended therebetween in substantial parallel relation to the axis of the bearing 7.

A head 19 is slidable on said rod and has a forwardly projecting lug with a vertical bore therethrough adapted to receive a downwardly extending hook member 20, the shank of which is threaded and provided with a suitable nut, preferably of the wing type, which contacts the top of member 19 and holds the said hook in adjusted position. The flat angular portions of the frame members 2 and 3 have mounted for sliding movement thereon angular brackets 15, provided with set screws 16 offset in a forward and rearward direction, two of which extend into the said brackets from the top and the other of which extends thereinto from the bottom. All of these set screws are adapted to engage the horizontal plate-like portion of member 4, and the similar part of end member 3. The brackets 15 are thus slidable on said plate portions forwardly and rearwardly and can be secured in any desired position thereon. These brackets 15 have an inwardly projecting arm to which is secured a flat bar 13 extending therebetween. This bar 13 has a pair of L-shaped members 17 slidable thereon, one arm of which projects beneath and forwardly therefrom. Clamping hooks 18 having horizontally projecting arms and downwardly projecting threaded shanks are threaded through the said projecting portion and held in adjusted position therein by suitable wing nuts.

In operation, the head part of the lawn mower comprising the cutter head *a*, the supporting wheels *b*, cutter bar *c* and brace rod *d* is brought bodily to the machine. The same can be hung and supported by hooking the brace rod *d* into the hook 20. The end of the axle of the cutter head is now moved into the socket of the member 8 and suitably engaged with the slot therein, so that the same will be driven when the member 8 is turned. The cutter bar *c* of the lawn mower will be disposed on the bar 13 and this bar will be suitably moved into place to properly support the said cutter bar. The clamping members 18 will now be moved inwardly by sliding the members 17 on bar 13 and the same engaged over the frame of the lawn mower, as illustrated in Fig. 1. These clamping members can be brought into firm engagement with the mower head by tightening the nuts thereon. The lawn mower is now firmly and rigidly supported in the machine and by operating the clutch lever 11, power may be applied to the pulley 9 by a suitable belt and the cutter head *a* will be turned and may be sharpened as desired. The cutter bar *c* being held on the flat bar 13 in firm relation, the cutters will be sharpened so as to move in correct relation thereto. The bar 13 and the cutter bar can be tilted to the desired position by adjusting set screws 16, and can, likewise, be moved vertically by adjustment of said screws as the cutter bar is usually provided with means for adjusting and clamping the same in different positions on the cutter head. The mower can be quickly and easily removed from the machine by loosening the clamping parts.

From the above description it is seen that applicant has provided an extremely simple and efficient machine especially adapted to facilitate the accurate sharpening of the lawn mower or cutters of similar construction. The auxiliary supporting means at the top of the machine assists greatly in holding the mower while it is being brought into correct position to be clamped. The mower blades are sharpened without removing the cutter head from the wheel frame and these blades will thus be maintained in their proper relation to the cutter bar as the latter will be clamped in adjusted position in the cutter head. The parts of the device are few and simple and the device can be inexpensively made and assembled.

It will, of course, be understood that various changes may be made in the form, details and arrangement of the parts without departing from the scope of applicant's invention, which, generally stated, consists in the matter shown and described and set forth in the appended claims.

What is claimed is:

1. A device for sharpening lawn mowers having in combination, a frame, means thereon for holding and supporting the axle of the assembled cutter head and cutting blade of a lawn mower, means for turning the said means to rotate the cutter head against the blade, and auxiliary supporting means adjustable at each end of the frame for said cutter head and cutter blade extending above the same.

2. A device to sharpen lawn mowers having in combination, means for receiving and holding the cutter shaft of an assembled cutter head and cutter bar of a lawn mower, a member transversely adjustable relatively to said means for supporting the cutter bar, means for turning said means to turn said shaft and rotate the cutters of the cutter head, and auxiliary means depending from the frame for supporting the assembled cutter head comprising vertically adjustable standards at each end of the frame, a bar carried thereby, and a supporting member slidable on said bar.

3. The structure set forth in claim 2, and means for clamping the cutter bar firmly in position on said adjustable supporting member.

4. A device to sharpen lawn mowers having in combination, a frame comprising spaced end members, each having horizontal and forwardly extended plate-like portions, brackets slidable on said portions, means for securing said brackets in position thereon, a bar secured to and extending between said brackets, and clamping means slidably mounted on said bar.

5. A device for sharpening lawn mowers having in combination, a frame including spaced end members, one of said members comprising a bearing, a shaft rotatable in said bearing, a member on the inner end of said shaft for receiving and rotating the axle of the cutter head of the lawn mower, vertically adjustable rods in each of said end members, a rod connecting the upper ends of said vertically adjustable members, and a support slidable on said last mentioned rod having means depending therefrom for supporting the cutter head of the lawn mower.

6. A device of the class described having in combination, a frame, means thereon to receive and rotate the shaft of the cutter head of the lawn mower, means for supporting the cutter bar of said mower and auxiliary means adapted for vertical and longitudinal movement for supporting the cutter head extending above the same.

7. A device to sharpen lawn mowers and support the assembled cutter head and bar thereof having in combination, a frame comprising spaced end members, each having a forwardly projecting portion, brackets slidable in said portions, means secured to and extending between said brackets adapted to support the cutter bar, and means for tilting said brackets and bar and holding the same in position.

8. A device to sharpen lawn mowers and support the assembled cutter head and bar thereof having in combination, a frame comprising spaced end members, each having a forwardly projecting portion, brackets slidable in said portions, means secured to and extending between said brackets adapted to support the cutter bar, and means for moving and holding said brackets and means secured thereto in various different vertical and angular positions.

In testimony whereof I affix my signature.

FRANK H. BIERMAN.